Patented Dec. 5, 1933

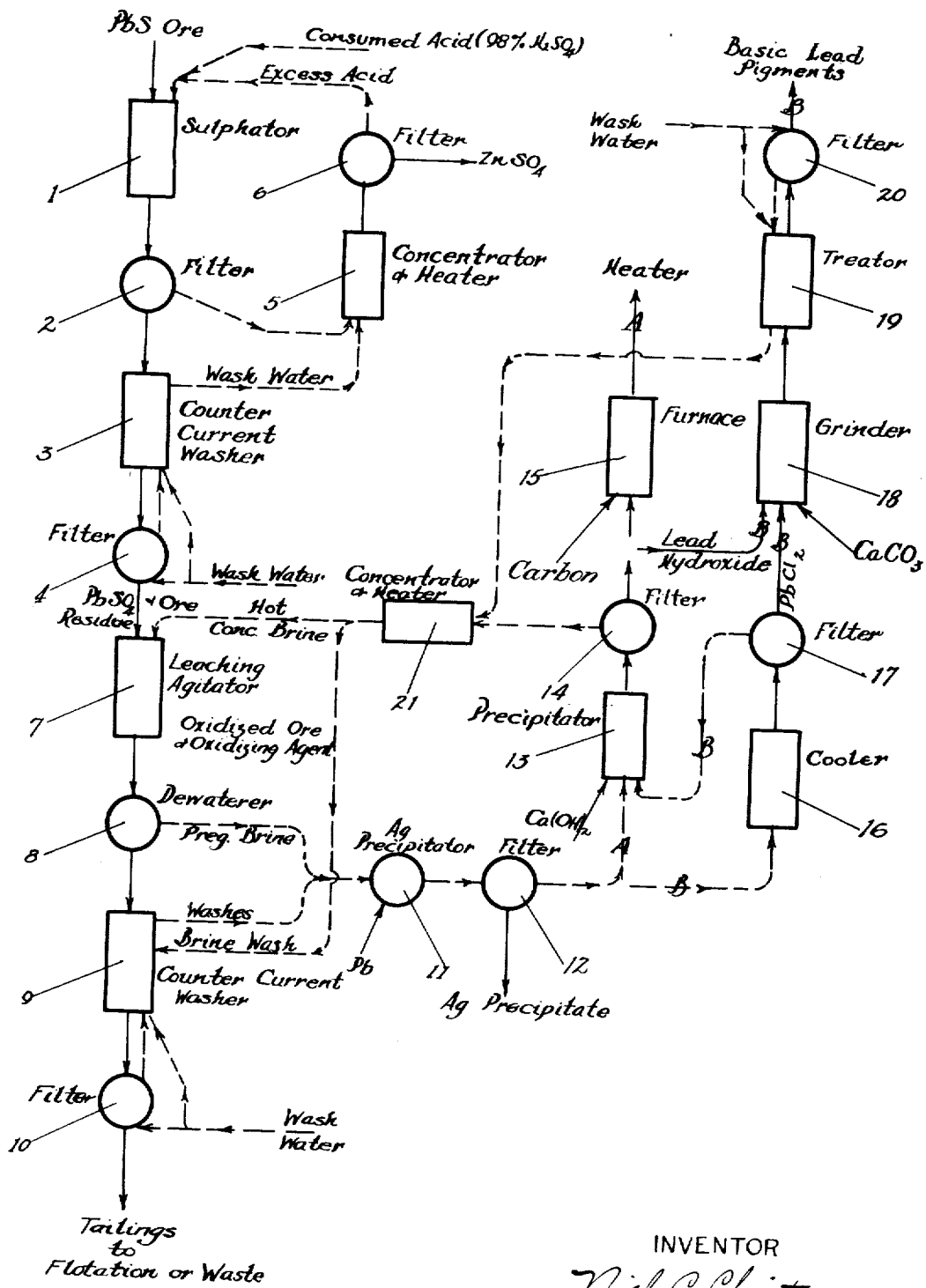

1,937,637

UNITED STATES PATENT OFFICE 1,937,637

PROCESS OF TREATING LEAD SULPHIDE ORES

Niels C. Christensen, Salt Lake City, Utah

Application September 29, 1931, Serial No. 565,862
Renewed October 10, 1933

25 Claims. (Cl. 23—146)

This invention relates to a process for the treatment of lead sulphide ores or concentrates for the recovery of lead therefrom as metallic lead or lead products. The process consists of four main steps or parts, the converting of the lead in the ore to lead sulphate, the extraction of the lead from the sulphated ore by leaching with hot concentrated brine, the precipitation of the lead from the brine, and the treatment of the precipitated products for the recovery of metallic lead or for the making of marketable lead products.

It is well known that lead sulphide may be converted to the sulphate by a suitable roasting operation or by treatment with hot concentrated sulphuric acid containing over 90% $H_2SO_4$. The sulphatizing roast is however not an entirely satisfactory operation due to dust loss, incomplete sulphatization, loss by volatilization, and the necessity of oxidizing the other sulphides, such as pyrite mixed with the lead sulphide. Treatment with an excess of hot sulphuric acid of high concentration results in a high acid consumption due to the reduction of the acid by the sulphide and the reaction between the freed sulphur and the hot acid as indicated in the following equations:

$$3PbS + 4H_2SO_4 = 3PbSO_4 + 4S + 4H_2O$$
$$2H_2SO_4 + S = 3SO_2 + 2H_2O$$

The sulphur thus formed is mixed with the treated ore and requires special treatment if it is to be recovered. Treatment with acids of such high concentration also involves a considerable concentrating operation to recover the excess acid and also involves some difficulty and danger in operation.

The present invention aims to sulphate the lead and recover the sulphur as $H_2S$ by treatment with sulphuric acid of such lower concentration that substantially no free sulphur is formed, avoids the necessity for high concentration of the excess acid used, and avoids much of the danger and difficulty involved in handling highly concentrated acid.

As noted in my U. S. Patent 1,434,084, hot sulphuric acid of a concentration between 60% and 70% does not attack or dissolve galena to any appreciable extent. I have found, however, that sulphuric acid of 60–70% will react with the surface only of the galena particles to form a very thin superficial coating of $PbSO_4$ and will drive off the sulphur in the attacked galena as indicated in the following equation:

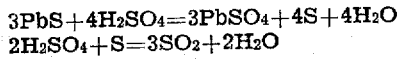
$$PbS + H_2SO_4 = PbSO_4 + H_2S$$

The lead sulphate thus formed being practically insoluble in sulphuric acid of this concentration is not dissolved and protects the remainder of the coated particle against further action by the acid. I have found however that by grinding the ore while treating it with the hot sulphuric acid of this concentration, the galena may be completely converted to the sulphate and all the sulphur be driven off as $H_2S$ as indicated in the foregoing equation, the grinding or attrition rubbing the sulphate coating from the galena particles and allowing the reaction to go to completion. The lead sulphate thus formed is subsequently dissolved away from the ore residue by leaching with a sodium chloride brine, the sulphate as is well known, being soluble in sodium or calcium chloride brines. The method of recovering the lead from this solution and the treatment of the precipitate depends upon the final product desired as described below.

The accompanying flow sheet illustrates the practical application of the process as described in the following.

The first and essential step of the process, the sulphating of the galena and driving off of the sulphur as $H_2S$ is carried out by grinding the ore from 15 to 30 minutes with sufficient excess of hot sulphuric acid of a concentration between 60 and 75%, preferably approximately 65% to make a fluid pulp. This operation is preferably carried out in a properly acid-proofed pebble mill having a silex or porcelain lining and supplied with flint pebbles or porcelain marbles as a grinding medium. This apparatus is called the sulphator (1) in the following description. To prevent contamination of the $H_2S$ the acid and ore are preferably sent into and discharged from the mill through suitable air-tight glands. In the treatment of some ores the lead may be partially sulphated with acids of a concentration as low as 50% but for complete sulphating in a short period 65% acid is preferred. The acid consumed in the sulphating operation may be added as 98% acid in order to avoid excessive evaporation in the process, but this acid should be mixed with the circulating acid before coming into contact with the ore in order to avoid loss of acid and $H_2S$ due to the reaction between the ore and highly concentrated acid as noted above. Acids of as high a concentration as 75% may be used, but at this point there is some reaction between the $H_2S$ evolved and the excess acid resulting in excessive acid consumption and loss of $H_2S$. Any zinc sulphide in the sulphide ore or concentrates is sulphated as described in my copending patent applications 564,695 and 564,696 of Sept. 23, 1931 and 565,153 of Sept. 25, 1931, and may be recovered and utilized as described therein, or if present in small quantity may be recovered as described below. Pyrite and chalcopyrite, as previously noted in my U. S. Patent 1,434,084 the silver sulphide minerals are mostly not attacked by sulphuric acid of the strength used in this process. The sulphated ore and excess of hot acid from the sulphator (1) goes to the filter (2) where the excess or circulating acid is filtered out and passed through the heater and concentrator (5) and used over again in the treatment of more ore as shown. The acid filter cake from the filter (2) is washed free of acid (and zinc sulphate if the ore contains zinc) preferably in a counter-current washer (3) and filter (4) as shown. The acid solution (containing any zinc in the ore) from this washing operation may be passed through the concentrator and heater (5) (along with the circulating acid) and the water is evaporated off to make acid of the required concentration. This concentrating operation precipitates the zinc sulphate which may be in solution which is filtered out in the filter (6) and the hot acid sent to the sulphator for reuse.

The washed lead sulphate and ore residue from the filter (4) is treated with hot concentrated sodium chloride brine containing $CaCl_2$, from the precipitation of the lead in a previous cycle, in the leaching agitator (7). The lead sulphate is dissolved in the brine forming lead chloride in solution and precipitating calcium sulphate as indicated in the following equation:

$$PbSO_4 + CaCl_2 = PbCl_2 + CaSO_4$$

If pure high grade lead pigments are to be made in the process any traces of iron and manganese in the solution at this point may be precipitated at the end of the leaching operation by the addition of sufficient oxidized ore and a suitable oxidizing agent such as lead peroxide.

The mixture of leached ore residue and pregnant brine containing the lead chloride is sent from the agitator (7) to the dewaterer (8) where the pregnant solution is separated and sent to the precipitating department. The ore residue from the dewaterer (8) is washed first with hot barren brine and then with hot water in the counter-current washer (9) and filter (10), the wash solutions being mixed with the pregnant brine, and sent to the precipitating department and the ore residue may be treated by flotation for recovery of pyrite, and the gold and silver, etc.

The leaching operation in the agitator (7) may be conducted with a neutral brine if it is not desired to dissolve any silver at this stage of the ore treatment. If it is desired to recover as much silver as possible in the agitator, sufficient acid may be added at the beginning of the leaching operation to bring the soluble silver into solution. The excess acid is then neutralized at the end of the leaching operation by the addition of oxidized lead ore, as noted above.

The hot pregnant solutions from the dewaterer (8) and washer (9) are mixed and, if any silver is dissolved, treated with metallic lead (preferably lead dust) in the precipitator (11) to remove the silver (and copper if any is present) and the precipitate and excess lead dust is filtered away from the solution in the filter (12). If no silver or copper is present in the solution at this point this precipitation step and the precipitator (11) and filter (12) may be eliminated. If desired the silver (and copper) brought into solution in the agitator (7) may also be precipitated at the end of the leaching treatment by the addition of a small amount of lead dust or soluble sulphide (such as $Ca(SH)_2$) at the end of the leaching operation, the metals thus being precipitated in the pulp and later recovered in the flotation treatment of the ore residue. If this method is used the precipitator (11) and filter (12) would be eliminated.

The recovery of the lead from pure pregnant brine prepared by any one of the foregoing methods may be carried out to make lead bullion as shown in the flow sheet from A to A, or for the manufacture of lead pigments by the methods illustrated in the flowsheet in the flow line B—B—B—B. By the first method (A—A) all the lead is precipitated from the pregnant solution by agitation with lime or calcium hydroxide in the precipitator (13), the lead being precipitated mainly as a hydroxide with the formation of $CaCl_2$ in solution as indicated in the following equation:

$$PbCl_2 + Ca(OH)_2 = Pb(OH)_2 + CaCl_2$$

The precipitate is not a pure hydroxide, however, as shown in the equation but contains some hydroxychloride and unconsumed calcium hydroxide. A substantially complete precipitation may be secured with considerably less than a chemical equivalent of lime to lead since an equivalent of lime to lead is necessary for the recovery of the lead in the furnace if it is preferred to add the full amount of required lime at this point. The hydroxide precipitate is separated from the barren solution by filtration in the filter (14) and mixed with carbon and (preferably after drying) is heated to a red heat in the furnace (15) to reduce the lead to metallic form (or is heated with any other suitable reducing agent such as natural gas to form metallic lead). The hydroxychloride and unconsumed lime in the precipitate react in the smelting treatment to give metallic lead and a small amount of calcium chloride slag which is added to the leaching solution for removal of the sulphate as described above. The smelting or reducing operation may be carried out in a blast furnace (or retort if desired) but smelting in a reverberatory furnace with a slag or cover consisting of a mixture of calcium chloride and sodium chloride is preferred, as briquetting of the precipitate is not required for this treatment and volatilization loss is less than in the blast furnace. Little or no washing of the lead precipitate is required in the filter (14) as the salt and $CaCl_2$ in the filter cake is recovered in the slag from the furnace (15) and returned to the leaching circuit.

If the lead is to be recovered as a paint pigment or other lead products, the precipitation and subsequent treatment of the products is carried out as shown in the flow B—B—B—B. In this case the hot pregnant brine is passed through the cooler (16) where the temperature of the solution is reduced to the point required to throw out the required proportion of the lead as lead chloride. If desired or necessary the solution may also be diluted with water, preferably wash solution from the treater (19), to precipitate a greater proportion of the lead than is possible with the more concentrated pregnant brine. The $PbCl_2$ thus precipitated is filtered out of the solution in the filter (17) and the partially precipitated solution is then agitated with $Ca(OH)_2$ in the precipitator (13) to precipitate the remainder of the lead from solution as described above. The lead hydroxide precipitate is filtered out of the barren brine in the filter (14) and this barren solution is concentrated and heated in the concentrator (21) and used over again in the leaching agitator 7, for the treatment of more sulphated ore as above described.

The lead hydroxide precipitate from the filter (14) and the PbCl₂ from the filter (17) are utilized to make the desired lead pigments briefly described below. To make basic lead carbonate (white lead) the lead hydroxide precipitate and the lead chloride are used in the ratio of one molecular weight of lead hydroxide to two molecular weights of lead chloride and mixed with finely divided CaCO₃ in the ratio of two molecular weights. This moistened mixture is ground together in the grinder or pebble mill (18) and thereafter treated with water (preferably hot) in the agitator or treater (19). This treatment results in the formation of basic lead carbonate according to the reaction shown in the following equation:

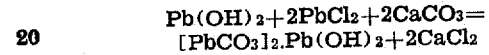
$$Pb(OH)_2 + 2PbCl_2 + 2CaCO_3 = [PbCO_3]_2 \cdot Pb(OH)_2 + 2CaCl_2$$

The CaCl₂ is washed out of the precipitate in the treater preferably by counter-current treatment with water during the conversion to the basic carbonate, and the basic carbonate is filtered in the filter (20) and dried or emulsified with oil to make the finished white lead pigment. The product made in this manner is of excellent quality as to color, tinting strength, and covering power being superior to most of the white lead produced by treatment of metallic lead by the methods now in common use. By varying the proportion of Pb(OH)₂ precipitate to PbCl₂ and CaCO₃ in the foregoing treatment white lead products of any desired ratio of Pb(OH)₂ to PbCO₃ may be obtained.

If it is desired to make a basic lead sulphate mixture, the procedure is similar to the foregoing except that CaSO₄ is substituted for CaCO₃ in the mixture. In this treatment of the mixture the PbCl₂ reacts with the CaSO₄ to form PbSO₄ and CaCl₂ as indicated in the following equation:

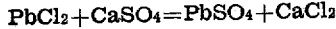
$$PbCl_2 + CaSO_4 = PbSO_4 + CaCl_2$$

The CaCl₂ is washed out of the precipitate as previously described leaving a mixture of the Pb(OH)₂ and PbSO₄ in the desired ratio.

If desired the PbCl₂ may be mixed with the CaCO₃ or the CaSO₄ and ground and treated with water to make the normal carbonate or sulphate as indicated below:

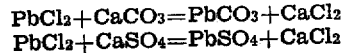
$$PbCl_2 + CaCO_3 = PbCO_3 + CaCl_2$$
$$PbCl_2 + CaSO_4 = PbSO_4 + CaCl_2$$

and the PbCO₃ and PbSO₄ may then be mixed with the desired proportion of the lead hydroxide precipitate and ground and treated with water to form the desired basic carbonate or the desired basic sulphate mixture.

To make lead hydroxychloride, the lead chloride from the filter (17) is mixed with the lead hydroxide precipitate from the filter (19) and ground together and treated with water to remove the CaCl₂. By this treatment lead hydroxychloride is formed according to the following equation:

$$Pb(OH)_2 + PbCl_2 = 2PbOHCl$$

By varying the ratio of PbCl₂ to Pb(OH)₂ hydroxychlorides containing any desired proportion of hydroxide to chloride may be secured. The normal hydroxychloride PbOHCl is a white pigment of high hiding power and tinting strength, though the color is not as white as the basic carbonate, inclining to a yellowish tinge. Hydroxychlorides with greater proportions of the hydroxide are more yellow with increase in hydroxide and with two parts of hydroxide to one of chloride are a bright yellow.

The process as described above is applicable to all types of lead sulphide ores and concentrates, both simple lead sulphide ore and so called complex sulphide ores of lead and zinc or lead and copper. Its application to the latter type of ores is more fully disclosed in my copending application Serial No. 568,514, filed Oct. 12, 1931.

The methods and apparatus described in the foregoing are merely those preferred at the present time for carrying out the process in commercial operation. Other forms of apparatus and variations in method may be successfully used in carrying out the process either as a batch or as a continuous process and it is therefore not desired to restrict the invention only to the apparatus and methods described above.

The initial treatment of the lead sulphide ores and concentrates, as described herein, and the making of lead sulphate and basic lead sulphate, as described herein, are claimed in my concurrent application 565,851.

Having described my invention what I claim and desire to patent is:

1. The process of treating lead sulphide ores and concentrates which consists in grinding said ores and the like with an excess of hot sulphuric acid of such concentration that the lead sulphide is converted to lead sulphate and the sulphur is driven off as H₂S, and filtering and washing said excess acid away from said lead sulphate and residue of ore and concentrating and heating said acid and using it in the treatment of more of said ore material, and dissolving said lead sulphate in a hot concentrated chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide.

2. The process of treating lead sulphide ores and concentrates which consists in grinding said ores and the like with an excess of hot sulphuric acid of a concentration between 50% and 75% H₂SO₄ and thereby converting the lead sulphide to lead sulphate, and filtering and washing said excess acid away from said lead sulphate and residue of ore and concentrating and heating said acid and using it in the treatment of more of said ore material, and dissolving said lead sulphate in a hot concentrated sodium chloride brine containing calcium chloride and separating said pregnant brine from the residue of ore, and cooling said pregnant brine and precipitating lead chloride therefrom and separating said precipitated lead chloride from said solution and thereafter precipitating the residual lead therefrom with calcium hydroxide.

3. The process of treating lead sulphide ores and concentrates which consists in grinding said ores and concentrates with hot sulphuric acid of a concentration between 60% and 70% H₂SO₄ and thereby converting the lead sulphite to lead sulphate and driving off the sulphur as H₂S, and filtering and washing said excess acid away from said lead sulphate and residue of ore and concentrating and heating said acid and using it in the treatment of more of said ore material, and dissolving said lead sulphate in a hot concentrated sodium chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide.

4. The process of treating lead sulphide ores and concentrates which consists in grinding said ores and concentrates with hot sulphuric acid of a concentration between 60% and 70% $H_2SO_4$ at a temperature near the boiling point of said acid, and thereby converting the lead sulphide to lead sulphate and driving off the sulphur as $H_2S$, and filtering and washing said excess acid away from said lead sulphate and residue of ore and concentrating and heating said acid and using it in the treatment of more of said ore material, and dissolving said lead sulphate in a hot concentrated sodium chloride brine containing calcium chloride and separating said pregnant brine from the residue of ore, and cooling said pregnant brine and precipitating lead chloride therefrom and separating said precipitated lead chloride from said solution and thereafter precipitating the residual lead therefrom with calcium hydroxide.

5. The process of treating lead sulphide ores and concentrates which consists in grinding said ores and the like with an excess of hot sulphuric acid of such concentration that the lead sulphide is converted to lead sulphate and the sulphur is driven off as $H_2S$, and filtering and washing said excess acid away from said lead sulphate and residue of ore and concentrating and heating said acid and using it in the treatment of more ore material, and dissolving said lead sulphate in a hot concentrated sodium chloride brine containing calcium chloride and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead hydroxide precipitate and said lead chloride and grinding said mixture and treating with water to form lead hydroxychloride.

6. The process of treating lead sulphide ores and concentrates which consists in grinding said ores and the like with an excess of hot sulphuric acid of a concentration between 50% and 75% $H_2SO_4$ and thereby converting the lead sulphide to lead sulphate, and filtering and washing said excess acid away from said lead sulphate and residue of ore and concentrating and heating said acid and using it in the treatment of more ore material, and dissolving said lead sulphate in a hot concentrated sodium chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead hydroxide precipitate and said lead chloride and grinding said mixture and treating with water to form lead hydroxychloride.

7. The process of treating lead sulphide ores and concentrates which consists in grinding said ores and concentrates with hot concentrated sulphuric acid of a concentration between 60% and 70% $H_2SO_4$ and thereby converting the lead sulphide to lead sulphate and driving off the sulphur as $H_2S$, and filtering and washing said excess acid away from said lead sulphate and residue of ore and concentrating and heating said acid and using it in the treatment of more ore material, and dissolving said lead sulphate in a hot concentrated sodium chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead hydroxide precipitate and said lead chloride and grinding said mixture and treating with water to form lead hydroxychloride.

8. The process of treating lead sulphide ores and concentrates which consists in grinding said ores and concentrates with hot sulphuric acid of a concentration between 60% and 70% $H_2SO_4$ at a temperature near the boiling point of said acid, and thereby converting the lead sulphide to lead sulphate and driving off the sulphur as $H_2S$, and filtering and washing said excess acid away from said lead sulphate and residue of ore and concentrating and heating said acid and using it in the treatment of more ore material, and dissolving said lead sulphate in a hot concentrated sodium chloride brine containing calcium chloride and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead hydroxide precipitate and said lead chloride and grinding said mixture and treating with water to form lead hydroxychloride.

9. The process of treating lead sulphide ores and concentrates which consists in grinding said ores and the like with an excess of hot sulphuric acid of such concentration that the lead sulphide is converted to lead sulphate and the sulphur is driven off as $H_2S$, and filtering and washing said excess acid away from said lead sulphate and residue of ore and concentrating and heating said acid and using it in the treatment of more ore material, and dissolving said lead sulphate in a hot concentrated sodium chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead hydroxide precipitate with said lead chloride and an equimolecular proportion of finely divided calcium carbonate to said lead chloride and grinding said mixture and treating with water and thereby making basic lead carbonate and calcium chloride therefrom and washing said calcium chloride out of said basic lead carbonate.

10. The process of treating lead sulphide ores and concentrates which consists in grinding said ores and the like with an excess of hot sulphuric acid of a concentration between 50% and 75% $H_2SO_4$ and thereby converting the lead sulphide to lead sulphate, and filtering and washing said excess acid away from said lead sulphate and residue of ore and concentrating and heating said acid and using it in the treatment of more ore material, and dissolving said lead sulphate in a hot concentrated sodium chloride brine containing calcium chloride and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead hydroxide precipitate with said lead chloride and an equimolecular proportion of finely divided calcium carbonate to said lead chloride and grinding said mixture and treating with water and thereby making basic lead carbonate and calcium chloride therefrom and washing said calcium chloride out of said basic lead carbonate.

11. The process of treating lead sulphide ores and concentrates which consists in grinding said ores and concentrates with hot concentrated sulphuric acid of a concentration between 60% and 70% $H_2SO_4$ and thereby converting the lead sulphide to lead sulphate and driving off the sulphur as $H_2S$, and filtering and washing said excess acid away from said lead sulphate and residue of ore and concentrating and heating said acid and using it in the treatment of more ore material, and dissolving said lead sulphate in a hot concentrated sodium chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead hydroxide precipitate with said lead chloride and an equimolecular proportion of finely divided calcium carbonate to said lead chloride and grinding said mixture and treating with water and thereby making basic lead carbonate and calcium chloride therefrom and washing said calcium chloride out of said basic lead carbonate.

12. The process of treating lead sulphide ores and concentrates which consists in grinding said ores and concentrates with hot concentrated sulphuric acid of a concentration between 60% and 70% $H_2SO_4$ at a temperature near the boiling point of said acid, and thereby converting the lead sulphide to lead sulphate and driving off the sulphur as $H_2S$, and filtering and washing said excess acid away from said lead sulphate and residue of ore and concentrating and heating said acid and using it in the treatment of more ore material, and dissolving said lead sulphate in a hot concentrated sodium chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead hydroxide precipitate with said lead chloride and an equimolecular proportion of finely divided calcium carbonate to said lead chloride and grinding said mixture and treating with water and thereby making basic lead carbonate and calcium chloride therefrom and washing said calcium chloride out of said basic lead carbonate.

13. The process of treating lead sulphide ores and concentrates which consists in grinding said ores and the like with an excess of hot sulphuric acid of such concentration that the lead sulphide is converted to lead sulphate and the sulphur is driven off as $H_2S$, and filtering and washing said excess acid away from said lead sulphate and residue of ore and concentrating and heating said acid and using it in the treatment of more ore material, and dissolving said lead sulphate in a hot concentrated sodium chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead hydroxide precipitate with said lead chloride and an equimolecular proportion of finely divided calcium sulphate to said lead chloride and grinding said mixture and treating with water and thereby making basic lead sulphate and calcium chloride therefrom and washing said calcium chloride out of said basic lead sulphate.

14. The process of treating lead sulphide ores and concentrates which consists in grinding said ores and the like with an excess of hot sulphuric acid of a concentration between 50% and 75% $H_2SO_4$ and thereby converting the lead sulphide to lead sulphate, and filtering and washing said excess acid away from said lead sulphate and residue of ore and concentrating and heating said acid and using it is the treatment of more ore material, and dissolving said lead sulphate in a hot concentrated sodium chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead hydroxide precipitate with said lead chloride and an equimolecular proportion of finely divided calcium sulphate to said lead chloride and grinding said mixture and treating with water and thereby making basic lead sulphate and calcium chloride therefrom and washing said calcium chloride out of said basic lead sulphate.

15. The process of treating lead sulphide ores and concentrates which consists in grinding said ores and concentrates with hot concentrated sulphuric acid of a concentration between 60% and 70% $H_2SO_4$ and thereby converting the lead sulphide to lead sulphate and driving off the sulphur as $H_2S$, and filtering and washing said excess acid away from said lead sulphate and residue of ore and concentrating and heating said acid and using it in the treatment of more ore material, and dissolving said lead sulphate in a hot concentrated sodium chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead hydroxide precipitate with said lead chloride and an equimolecular proportion of finely divided calcium sulphate to said lead chloride and grinding said mixture and treating with water and thereby making basic lead sulphate and calcium chloride therefrom and washing said calcium chloride out of said basic lead sulphate.

16. The process of treating lead sulphide ores and concentrates which consists in grinding said ores and concentrates with hot concentrated sulphuric acid of a concentration between 60% and 70% H₂SO₄ at a temperature near the boiling point of said acid, and thereby converting the lead sulphide to lead sulphate and driving off the sulphur as H₂S, and filtering and washing said excess acid away from said lead sulphate and residue of ore and concentrating and heating said acid and using it in the treatment of more ore material, and dissolving said lead sulphate in a hot concentrated sodium chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead hydroxide precipitate with said lead chloride and an equimolecular proportion of finely divided calcium sulphate to said lead chloride and grinding said mixture and treating with water and thereby making basic lead sulphate and calcium chloride therefrom and washing said calcium chloride out of said basic lead sulphate 17. The process of treating lead sulphide ores and concentrates which consists in grinding said ores and the like with an excess of hot sulphuric acid of such concentration that the lead sulphide is converted to lead sulphate and the sulphur is driven off as H₂S, and filtering and washing said excess acid away from said lead sulphate and residue of ore and concentrating and heating said acid and using it in the treatment of more ore material, and dissolving said lead sulphate in a hot concentrated sodium chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead chloride with an equimolecular proportion of finely divided calcium carbonate and grinding said mixture and treating with water and thereby making lead carbonate and calcium chloride therefrom and washing said calcium chloride away from said lead carbonate and mixing last said lead carbonate and above said lead hydroxide precipitate and grinding said mixture and treating with water to form basic lead carbonate and wash out calcium chloride therefrom.

18. The process of treating lead sulphide ores and concentrates which consists in grinding said ores and the like with an excess of hot sulphuric acid of a concentration between 50% and 75% H₂SO₄ and thereby converting the lead sulphide to lead sulphate, and filtering and washing said excess acid away from said lead sulphate and residue of ore and concentrating and heating said acid and using it in the treatment of more ore material, and dissolving said lead sulphate in a hot concentrated sodium chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead chloride with an equimolecular proportion of finely divided calcium carbonate and grinding said mixture and treating with water and thereby making lead carbonate and calcium chloride therefrom and washing said calcium chloride away from said lead carbonate and mixing last said lead carbonate and above said lead hydroxide precipitate and grinding said mixture and treating with water to form basic lead carbonate and wash out calcium chloride therefrom.

19. The process of treating lead sulphide ores and concentrates which consists in grinding said ores and concentrates with hot concentrated sulphuric acid of a concentration between 60% and 70% H₂SO₄ and thereby converting the lead sulphide to lead sulphate and driving off the sulphur as H₂S, and filtering and washing said excess acid away from said lead sulphate and residue of ore and concentrating and heating said acid and using it in the treatment of more ore material, and dissolving said lead sulphate in a hot concentrated sodium chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead chloride with an equimolecular proportion of finely divided calcium carbonate and grinding said mixture and treating with water and thereby making lead carbonate and calcium chloride therefrom and washing said calcium chloride away from said lead carbonate and mixing last said lead carbonate and above said lead hydroxide precipitate and grinding said mixture and treating with water to form basic lead carbonate and wash out calcium chloride therefrom.

20. The process of treating lead sulphide ores and concentrates which consists in grinding said ores and concentrates with hot concentrated sulphuric acid of a concentration between 60% and 70% H₂SO₄ at a temperature near the boiling point of said acid, and thereby converting the lead sulphide to lead sulphate and driving off the sulphur as H₂S, and filtering and washing said excess acid away from said lead sulphate and residue of ore and concentrating and heating said acid and using it in the treatment of more ore material, and dissolving said lead sulphate in a hot concentrated sodium chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead chloride with an equimolecular proportion of finely divided calcium carbonate and grinding said mixture and treating with water and thereby making lead carbonate and calcium chloride therefrom and washing said calcium chloride away from said lead carbonate and mixing last said lead carbonate and above said lead hydroxide precipitate and grinding said mixture and treating with water to form basic lead carbonate and wash out calcium chloride therefrom.

21. The process of treating lead sulphide ores and concentrates which consists in grinding said ores and the like with an excess of hot sulphuric acid of such concentration that the lead sulphide is converted to lead sulphate and the sulphur is driven off as H₂S, and filtering and washing said excess acid away from said lead sulphate and residue of ore and concentrating and heating said acid and using it in the treatment of more ore material, and dissolving said lead sulphate in a hot concentrated sodium chloride brine containing calcium chloride from a previous operation and separating said pregnant brine from the residue of ore, and cooling said pregnant brine to precipitate lead chloride therefrom and separating said precipitated lead chloride from said solution and thereafter precipitating the residual lead therefrom with calcium hydroxide, and mixing said lead chloride with an equimolecular proportion of finely divided calcium sulphate and grinding said mixture and treating with water and thereby making lead sulphate and calcium chloride therefrom and washing said calcium chloride away from said lead sulphate and mixing last said lead sulphate and above said lead hydroxide precipitate and grinding said mixture and treating with water to form basic lead carbonate and wash out calcium chloride therefrom.

22. The process of treating lead sulphide ores and concentrates which consists in grinding said ores and the like with an excess of hot sulphuric acid of a concentration between 50% and 75% $H_2SO_4$ and thereby converting the lead sulphide to lead sulphate, and filtering and washing said excess acid away from said lead sulphate and residue of ore and concentrating and heating said acid and using it in the treatment of more ore material, and dissolving said lead sulphate in a hot concentrated sodium chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead chloride with an equimolecular proportion of finely divided calcium sulphate and grinding said mixture and treating with water and thereby making lead sulphate and calcium chloride therefrom and washing said calcium chloride away from said lead sulphate and mixing last said lead sulphate and above said lead hydroxide precipitate and grinding said mixture and treating with water to form basic lead sulphate and wash out calcium chloride therefrom.

23. The process of treating lead sulphide ores and concentrates which consists in grinding said ores and concentrates with hot concentrated sulphuric acid of a concentration between 60% and 70% $H_2SO_4$ and thereby converting the lead sulphide to lead sulphate and driving off the sulphur as $H_2S$, and filtering and washing said excess acid away from said lead sulphate and residue of ore and concentrating and heating said acid and using it in the treatment of more ore material, and dissolving said lead sulphate in a hot concentrated sodium chloride brine containing calcium chloride from a previous operation and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead chloride with an equimolecular proportion of finely divided calcium sulphate and grinding said mixture and treating with water and thereby making lead sulphate and calcium chloride therefrom and washing said calcium chloride away from said lead sulphate and mixing last said lead sulphate and above said lead hydroxide precipitate and grinding said mixture and treating with water to form basic lead sulphate and wash out calcium chloride therefrom.

24. The process of treating lead sulphide ores and concentrates which consists in grinding said ores and concentrates with hot concentrated sulphuric acid of a concentration between 60% and 70% $H_2SO_4$ at a temperature near the boiling point of said acid, and thereby converting the lead sulphide to lead sulphate and driving off the sulphur as $H_2S$, and filtering and washing said excess acid away from said lead sulphate and residue of ore and concentrating and heating said acid and using it in the treatment of more ore material, and dissolving said lead sulphate in a hot concentrated sodium chloride brine containing calcium chloride and separating said pregnant brine from the residue of ore, and cooling said pregnant brine and precipitating lead chloride therefrom and separating said precipitated lead chloride from said solution and thereafter precipitating the residual lead therefrom with calcium hydroxide, and mixing said lead chloride with an equimolecular proportion of finely divided calcium sulphate and grinding said mixture and treating with water and thereby making lead sulphate and calcium chloride therefrom and washing said calcium chloride away from said lead sulphate and mixing last said lead sulphate and above said lead hydroxide precipitate and grinding said mixture and treating with water to form basic lead sulphate and wash out calcium chloride therefrom.

25. A process of treating lead sulphide ores and concentrates which comprises grinding the same with hot sulphuric acid of about 55 to 75% concentration, in such an amount that the sulphur content of the lead sulphide is substantially all given off in the form of $H_2S$ and the lead is substantially all converted into sulphate, separating the excess acid from the treated ore and returning such separated acid, as acid of about 55–75% strength, to the treatment of more of the said lead sulphide ore material, dissolving the lead sulphate in hot concentrated chloride brine containing $CaCl_2$, and separating the pregnant brine from the residue of the ore material, cooling the pregnant brine to precipitate lead chloride therefrom, separating the precipitated lead chloride and residual brine from each other, and precipitating the residual lead from the brine as lead hydroxide by calcium hydroxide.

NIELS C. CHRISTENSEN.

CERTIFICATE OF CORRECTION

Patent No. 1,937,637.  December 5, 1933.

NIELS C. CHRISTENSEN.

It is hereby certified that error appears in the printed specification of the above numbered patent requiring correction as follows: Page 3, line 144, claim 3, for "sulphite" read sulphide; page 5, line 103, claim 14, for "is" read in; and that the said Letters Patent should be read with these corrections therein that the same may conform to the record of the case in the Patent Office.

Signed and sealed this 20th day of February, A. D. 1934.

(Seal)

F. M. Hopkins
Acting Commissioner of Patents.